United States Patent [19]

Marsh

[11] 4,295,837
[45] Oct. 20, 1981

[54] SYNCHRONOUS BELT DRIVE SYSTEM

[75] Inventor: Richard L. Marsh, Springfield, Mo.

[73] Assignee: Dayco Corporation, Dayton, Ohio

[21] Appl. No.: 130,661

[22] Filed: Mar. 17, 1980

[51] Int. Cl.³ .................. F16H 7/02; B21D 53/28
[52] U.S. Cl. ........................ 474/153; 474/205; 29/159 R
[58] Field of Search ............ 474/148, 153, 205; 156/138; 29/159 R

[56] References Cited

U.S. PATENT DOCUMENTS

| | | | |
|---|---|---|---|
| 2,934,967 | 5/1960 | Worrall, Jr. | 474/148 |
| 2,937,538 | 5/1960 | Worrall, Jr. | 474/148 |
| 3,002,396 | 10/1961 | Worrall, Jr. | 474/148 |
| 3,114,598 | 12/1963 | Beckadolph et al. | 264/277 |
| 3,117,460 | 1/1964 | Traeger | 474/153 |
| 3,404,576 | 10/1968 | Cicognani et al. | 474/148 |
| 3,643,518 | 2/1972 | Semin et al. | 474/139 |
| 3,744,330 | 7/1973 | Sugimoto | 474/153 |
| 3,756,091 | 9/1973 | Miller | 474/153 |
| 3,977,265 | 8/1976 | Worley et al. | 474/153 |
| 4,108,011 | 8/1978 | Gregg et al. | 474/153 |
| 4,148,225 | 4/1979 | Redmond, Jr. et al. | 474/148 |

*Primary Examiner*—C. J. Husar
*Assistant Examiner*—Conrad Berman
*Attorney, Agent, or Firm*—Charles E. Bricker

[57] ABSTRACT

A synchronous belt drive system, particularly for small drive pulleys, and method of making such pulleys. The pulley has an optimum pitch radius for its belt teeth addendum circle which has a size between the limits of a maximum pitch radius determined by the radius of a circle through the points of a regular polygon having N equal sides and a minimum pitch radius determined by the radius of a circle having N arcs each equal in arcuate length to the length of each side of said polygon.

20 Claims, 4 Drawing Figures

SYNCHRONOUS BELT DRIVE SYSTEM

BACKGROUND OF THE INVENTION

1. Field of the Invention

This invention relates to a toothed synchronous belt and pulley drive system and method of making such pulley particularly adapted for use with a toothed belt made primarily of polymeric material. It is particularly directed to small diameter pulleys, as hereinafter defined.

2. Prior Art Statement

Synchronous belt and pulley drives for mechanical power systems, utilizing toothed polymeric belts, are well known and widely used throughout industry. Typically, a system of this type utilizes a plurality of toothed pulleys and a cooperating toothed endless power transmission belt. The transmission of power is provided by the driving action between the pulley teeth and the belt teeth. Such systems are sometimes called positive drives, or positive indexing drives.

In a belt drive system of this type, each belt tooth sequentially engages the pulley teeth during normal operation which usually produces a line contact between each associated belt tooth and pulley tooth. In the usual application, the contact force is greater at or near the root of the belt tooth than near the crown, or crest, of such tooth. This greater contact force is often accompanied by relative sliding movement between the pulley tooth and the belt tooth at the root producing accelerated belt tooth wear and failure. Such wear and failure occurs routinely even in belt drive systems where pulley sizes and mounting space are not restricted in any manner.

However, many special drive systems have restrictive space, weight, and performance limitations which dictate that at least one pulley of the drive system be of the smallest possible size, i.e., smallest radius for the pulley teeth addendum circle. In using toothed belts with such small radius pulleys in these special systems, belt tooth wear and failure occurs many times more rapidly than in what may be considered a more normal system.

The most common practice in manufacturing a toothed pulley for use with a toothed belt has been to manufacture such pulley employing a nominal radius basically determined by the equation $$R_{nom} = \frac{P \times N - 2\pi \times PLD}{2\pi}.$$

In this equation P equals the pitch of the toothed pulley and belt at the pulley pitch circle, PLD equals the distance between the belt pitch line and the pulley teeth addendum circle on radius, and N equals the number of pulley teeth.

Once the radius has been thus determined, the major effort in prior pulley constructions has then been directed toward providing the belt teeth and/or pulley teeth with special shapes in an effort to provide improved operation. In addition, various attempts have been made in prior pulley constructions to provide special widening and deepening of pulley grooves, special undercutting of teeth, truncating of teeth, and the like, still for the purpose of providing improved operation. The following U.S. patents are examples of previous efforts:

(1) Patent No. 2,934,967
(2) Patent No. 2,937,538
(3) Patent No. 3,002,396
(4) Patent No. 3,117,460
(5) Patent No. 3,404,576
(6) Patent No. 3,744,330

Each of the pulleys described in items (1), (2), and (3) appear to be constructed with a nominal radius as described above and, efforts have been made to provide special shapes to either the pulley teeth, the belt teeth, or both. Item (4) appears to deal with the special shaping of belt teeth. Item (5) appears to teach pulleys with undercutting adjoining each pulley tooth. Finally, item (6) appears to teach widening and deepening of the pulley grooves.

However, it is known that an optimum pulley has certain desirable features which include construction thereof so that during operation with a cooperating belt the actual path of travel of a belt tooth is provided upon entry and exit free of belt motion changing forces caused by the pulley. In addition, such a optimum pulley should be constructed to provide a close belt tooth to pulley groove fit. Finally, such an optimum pull y should be constructed to provide belt flank to tooth flank contact yet without relative sliding motion therebetween.

As used in this application, the term "small diameter pulley" refers to a diameter less than the diameter of a pulley referred to in U.S. Pat. No. 2,934,967, Column 3, lines 50 to 56.

SUMMARY

It is a feature of this invention to provide an improved toothed pulley of small diameter particularly adapted for use in synchronous belt drive system with a toothed power transmission belt made primarily of polymeric material wherein such pulley assures performance of the belt over a long service life.

Another feature of this invention is to provide a pulley of the character mentioned having the above-mentioned desirable features.

Another feature of this invention is to provide a pulley of the character mentioned having an optimum radius which provides performance which is better than previously proposed pulleys of small radius.

Another feature of this invention is to provide a toothed pulley for use in a synchronous drive power transmission system with a toothed endless power transmission belt made primarily of polymeric material wherein the toothed pulley has an optimum minimum radius for its pulley teeth addendum circle having a size between the limits of a maximum radius determined by the radius of a circle through the points of a regular polygon having N equal sides and a minimum radius determined by the radius of a circle having N arcs each equal in arcuate length to the length of each side of such polygon.

Another feature of this invention is to provide a toothed pulley of the character mentioned wherein the abovementioned minimum radius is determined by the formula presented above and the above-mentioned maximum radius is determined by another formula, which is presented subsequently in this specification, and determined by the radius of a circle through the points of a regular polygon having the same number of N equal sides with the length of each side of the polygon being equal to the length of each arc.

Another feature of this invention is to provide a toothed pulley of the character mentioned wherein such pulley has an optimum radius for its pulley teeth addendum circle determined by the simultaneous solution of two equations by trial and error and such equations are presented subsequently in this specification.

Another feature of this invention is to provide an improved synchronous drive system employing an improved pulley of the character mentioned.

Another feature of this invention is to provide an improved method of making a pulley of the character mentioned, in which a minimum of undercutting is required.

Another feature of this invention is to provide an improved method of making a pulley of the character mentioned wherein an optimum radius for the pulley teeth addendum circle is determined by the simultaneous solution of the above-mentioned two equations by trial and error by successive iteration employing a computer.

Therefore, it is an object of this invention to provide an improved toothed pulley, positive belt drive system employing same, and method of making such pulley having one or more of the novel features set forth above or hereinafter shown or described.

Other details, features, uses, objects, and advantages of this invention will become apparent from the embodiments thereof presented in the following specification, claims and drawings.

BRIEF DESCRIPTION OF THE DRAWINGS

The accompanying drawings show a present exemplary embodiment of this invention, in which.

DESCRIPTION OF ILLUSTRATED EMBODIMENT

Figure 1:
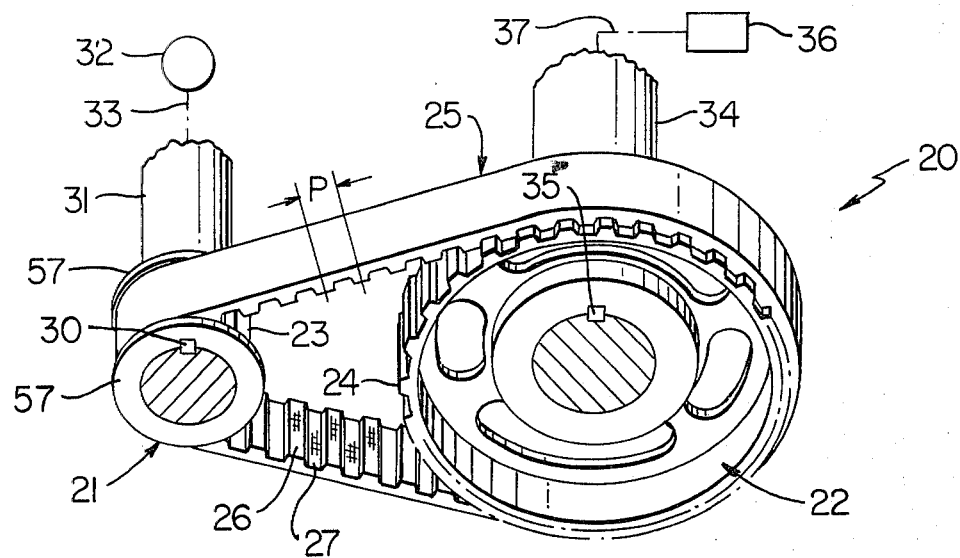
FIG. 1 is a perspective view illustrating one exemplary embodiment of a power transmission system of this invention which utilizes a standard toothed polymeric belt and a pair of toothed pulleys with the smaller pulley being made in accordance with the teachings of this invention.

Reference is now made to FIG. 1 of the drawings which illustrates one exemplary embodiment of a synchronous drive power transmission system or positive belt drive system in accordance with the teachings of this invention and such system is designated generally by the reference numeral 20. The power transmission system 20 comprises a plurality of toothed pulleys defined in the example by a toothed driving pulley 21 and a toothed driven pulley 22 having teeth 23 and 24 respectively. The power transmission system 20 also includes a toothed endless power transmission belt which is designated generally by the reference numeral 25 and the belt 25 has a toothed inner portion defined by projections which will be referred to as teeth 26 and such teeth 26 are disposed along the inner portion of the belt 25 in alternating relation with recesses 27 defined in such inner portion as is known in the art. The toothed belt 25 engages the toothed pulleys 21 and 22 and provides a positive drive connection between the pulleys 21 and 22; and, this reference to positive drive connection has the usual meaning of the art signifying that a driving action is produced which is substantially free of slippage between the belt 25 and the pulleys 21 and 22.

The driving pulley 21 of this example is operatively connected to a drive shaft 31 utilizing a key 30 and the shaft 31 is driven by a drive motor 32 which is indicated schematically, and is suitable operatively connected to the shaft 31 by a mechanical connection 33. The driven pulley 22 is operatively connected to a driven shaft 34 employing a key 35 and the output end of shaft 34 is suitably operatively connected by a mechanical connection 37 to a load 36 which is indicated schematically by a rectangular block.

Figure 2:
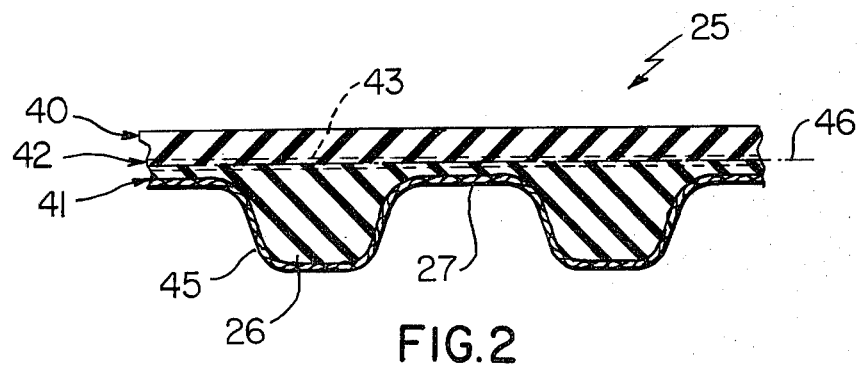
FIG. 2 is a fragmentary cross-sectional view of the belt of FIG. 1 taken parallel to its longitudinal axis.

The toothed belt 25 disclosed in connection with this exemplary embodiment of the invention is of standard construction and, as shown in FIG. 2, comprises a tension section 40, a compression section 41, and a load-carrying section 42 comprised of a helically wound load-carrying cord 43. The load-carrying cord 43 may be of any suitable type known in the art and is embedded in a suitable polymeric cushion material.

The toothed compression section has a fabric 45 defining its outside surface and thus the inside surface of the belt 25, whereby the fabric 45 defines the exposed outer surface of the teeth 26 as well as the recesses 27 between such teeth. The tension section 40 and compression section 41 are preferably made of suitable polymeric material, shown in the drawings by cross-hatching as rubber material. The fabric 45 is preferably a highly stretchable fabric, suitably treated with polymeric material compatible with the polymeric material of the teeth to assure tenacious bonding thereto.

Figure 4:
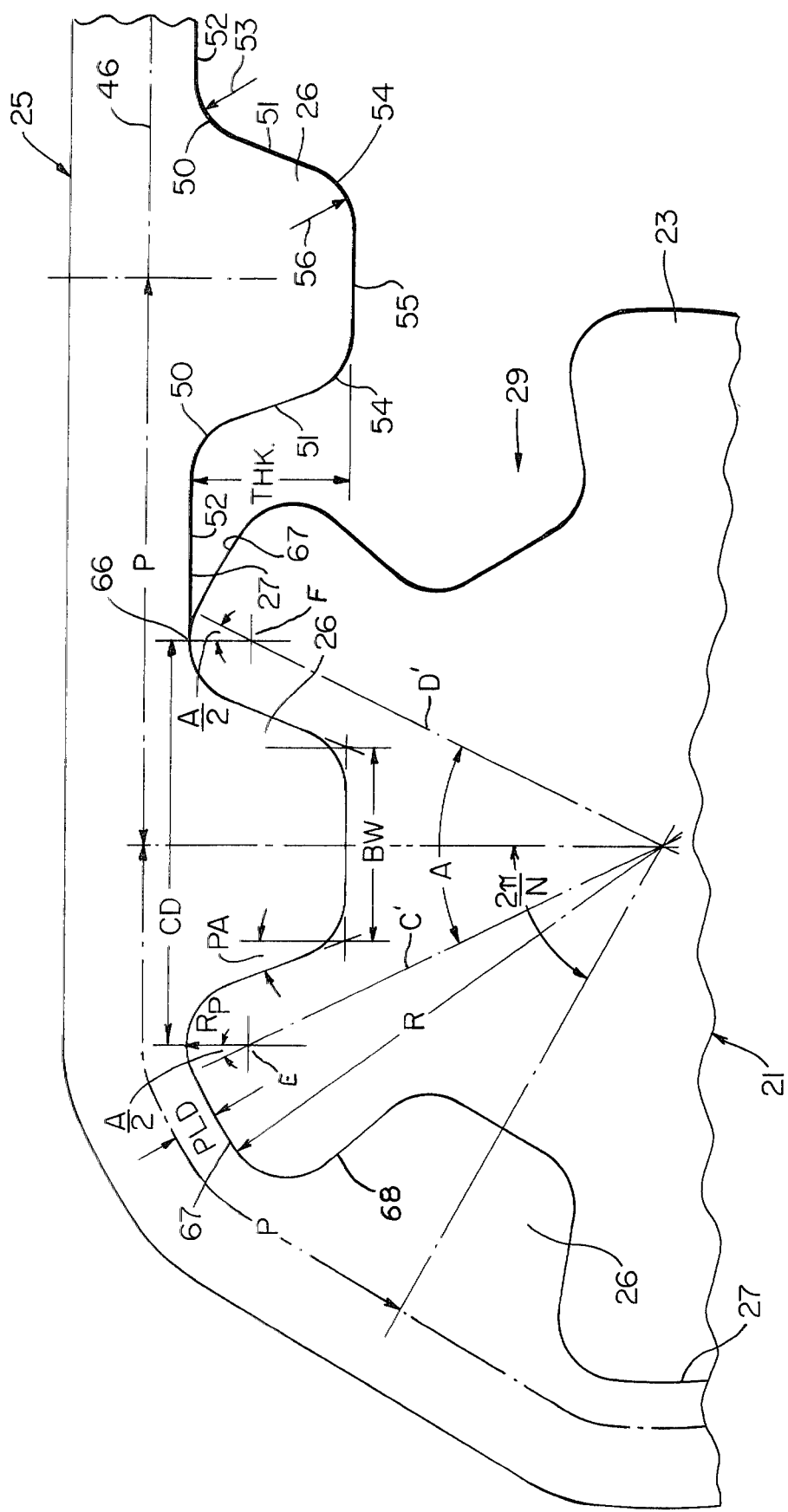
FIG. 4 is a greatly enlarged view illustrating a portion of the exemplary smaller toothed pulley of FIG. 1 and a portion of the toothed belt meshed therewith and particularly illustrating details of such pulley and method of making same.

The belt 25 has a pitch P for its teeth 26 as shown in FIG. 1 and FIG. 4. Further, and as best seen in FIG. 4, each belt tooth 26 has a bottom width BW, a pressure angle PA, and a thickness THK. The pitch line of the belt 25 is indicated by a dot-dash line 46 in FIGS. 2 and 4, and is defined by the neutral axis of such belt.

Each tooth 26 of the belt 25 has a curved portion 50 defining a root area therebetween, and each curved portion 50 extends between an associated belt tooth flank 51 and an associated inside surface portion 52 defining the bottom of recess 27. Each curved portion 50 defines an arc of a circle having a radius 53. Similarly, each tooth 26 has a curved portion 54 extending between each of its associated flanks 51 and a substantially planar surface 55 defining the crest or bottom of the associated tooth. Each curved portion 54 defines an arc of a circle having a radius 56. The magnitude or size of the radius 53 is defined within limits which are well known in the art, and the radius 53 is a nominal radius provided for a given standard toothed belt such as the belt 25 and is selected to minimize stress concentration at the root of each belt tooth 26. Similarly, each curved portion 54 defining an outer side portion of each crest of each tooth has a radius 56 provided in accordance with established practice for toothed power transmission belts.

The pulley 21 may be made of any suitable material known in the art and is preferably made of a high strength metallic material; and, the pulley 21 has a pair of side flanges defining its opposite sides and each flange is designated by the reference numeral 57. The flanges 57 are provided for reasons well known in the art and prevent the belt 25 from riding off of the pulleys 21 and 22 due to the inherent thrusting tendency of belt 25 as it operates around such pulleys.

The pulley 21 is constructed so that during operation thereof with belt 25 in a typical system, such as the drive system 20, the actual path of travel of each belt tooth 26 as it enters and exits each associated pulley recess 29 is free of belt tooth displacements caused by the pulley. Further, the pulley 21 provides a close belt tooth to pulley groove fit while providing belt tooth flank to pulley tooth flank contact without relative sliding motion therebetween. In addition, the pulley 21 has an optimum radius for its belt tooth addendum circle which assures provision of the desirable features mentioned in this paragraph.

Figure 3:
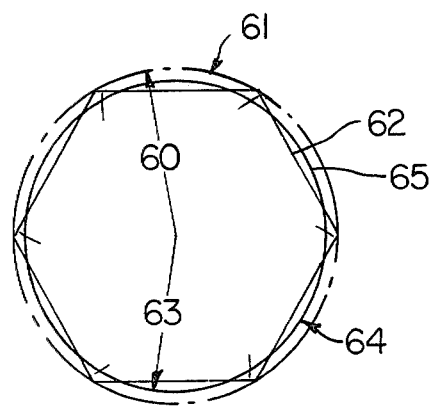
FIG. 3 is a schematic presentation particularly highlighting the size range within which the smaller toothed pulley of FIG. 1 is defined.

In particular, it has been found in accordance with this invention that the optimum radius for the belt tooth addendum circle is the radius R as illustrated in FIG. 4. This radius R has a size between the limits of a maximum radius determined by the radius 60 of a circle 61 through the points of a regular polygon having N equal sides 62 (shown as six equal sides in FIG. 3) and a minimum radius determined by the radius 63 of a circle 64 having N equal arcs 65 each equal in arcuate length to the length of each side of the polygon.

The maximum radius 60, indicated above, is determined by the formula:

$$R_{max} = \frac{P - \left[2 \times PLD \times \sin\left(\frac{pi}{N}\right)\right]}{2 \sin\left(\frac{pi}{N}\right)}$$

The minimum radius 63 is determined by the formula:

$$R_{min} = \frac{P \times N - 2 \times pi \times PLD}{2\, pi}$$

where P=pitch of the toothed pulley 21 and belt 25 at the pulley pitch circle, pi is a constant having a value of 3.14159+, PLD=distance between the belt pitch line and belt tooth addendum circle on radius, and N=number of pulley teeth 23.

The toothed pulley 21 has an optimum radius R as shown in FIG. 4 for its belt teeth addendum circle. The radius between each pulley tooth flank and its associated land is also shown in FIG. 4 and expressed by the term $R_p$. In order to determine the values of R and $R_p$ it is necessary to simultaneously solve two equations by trial and error. These equations are set forth below. The determination of these values is preferably achieved by successive iteration by employing a computer. During this computation, it should be understood that the values of BW, PA and THK are the corresponding dimensions of a toothed belt of the type used in positive belt drive systems. The value of $R_p$ is selected such that the arcuate length of a curved portion 50 of a belt tooth 26 extending between an associated inside surface portion 52 defining the bottom of the recess 27 shall be equal to the arcuate length of the curved portion 66 of the pulley tooth 23 extending between an associated pulley tooth flank 68 and an associated outside surface portion 67 defining the top of the pulley tooth 23. Practical machining limits dictate that the radius $R_p$ be described in thousandths of an inch where the exact value of angle A, a function of $R_p$, as determined by the computer, would calculate the value of $R_p$ to an infinite number of places. Therefore, $R_p$ is in increments of thousandths of an inch and R is in increments of half-thousandths of an inch.

The formulas which are used actually compute the value of angle A expressed in radians, by using the two formulas set forth below. By use of the iteration process referred to above, assumed values of R and $R_p$ are inserted in these formulas, and are repeated until the two formulas provide values for A in which the difference between the two values is at a minimum. This minimum is usually less than 0.0003 radian (1 minute of angle). When this minimum occurs, the values of R and $R_p$ which have been substituted, are therefore accepted as being the optimum values. The formulas referred to are set forth below.

$$A = 2 \sin^{-1}\left[\frac{CD}{2(R - R_p)}\right] \quad (1)$$

$$A = 2\left[\frac{P - CD - \frac{2pi}{N}(R + PLD)}{2(R_p - R)}\right] \quad (2)$$

where $CD = BW + (2R_p/\cos PA) + 2 \tan (PA)(THK - R_p)$

A=the angle of arc between the radius center of a pulley tooth flank and its associated land and the radius center of the next adjacent pulley tooth, P=pitch of the toothed pulley and belt at the pulley pitch circle, PLD=distance between the belt pitch line and belt tooth addendum circle on radius, N=number of pulley teeth, CD=rectilinear distance extending through two points E and F, located on legs $C^1$ and $D^1$, forming center of radius $R_p$, R=optimum radius for the belt teeth addendum circle, $R_p$=radius between each pulley tooth flank and its associated land having radius centers at E and F, BW=bottom width of belt tooth, PA=belt tooth pressure angle, and THK=belt tooth thickness.

It should be noted that the value of 2(Pi/N), shown as an angle in FIG. 4, is the maximum angle at which the pulley grooves may be cut. This value is also equal to the angular pitch of the pulley teeth.

The actual forming or manufacture of the toothed pulley 21 may be achieved using any suitable technique known in the art. Preferably such forming comprises machining a metal workpiece used to define the pulley with a fully topping hob to define alternating teeth 23 and grooves 29 therein. The machining action may be achieved employing theoretical pitch circle found by the equation:

$$2\, pi \times (R - PLD)$$

where R=the said optimum radius, and

PLD=distance between belt pitch line and the belt teeth addendum circle on radius.

In manufacturing a pulley in this manner, each of the grooves 29, thus defined, is deeper than the belt tooth thickness thereby providing clearance at the bottom of each tooth of the toothed belt. Once the teeth 23 are defined, the pair of side flanges 57 for the pulley may be made and suitably fixed in position on the pulley 21.

In this disclosure of the invention, the presentation has been directed to the determination of a toothed pulley having an optimum radius while utilizing a toothed belt. However, it will be appreciated that this process may be reversed and a toothed belt of any given design may be manufactured based on diameter of the pulley and the dimensions of the pulley teeth.

The present disclosure has been directed to the determination of a toothed pulley having an optimum radius for its belt teeth addendum circle for small diameter pulleys. However, it is to be understood that a similar technique may be employed to provide toothed pulleys of all sizes.

While present exemplary embodiments of this invention, and methods of practicing the same, have been illustrated and described, it will be recognized that this invention may be otherwise variously embodied and practiced within the scope of the following claims. For example, although the outer surface of the belt is shown as being flat, other types of outer surfaces may be utilized with the tooth design. The outer surface may be V-ribbed, as in U.S. Pat. No. 3,643,518; or may have lateral teeth as in U.S. Pat. Nos. 3,114,598 and 3,977,265.

What is claimed is:

1. In a toothed pulley for use in a synchronous drive power transmission system with a toothed endless power transmission belt made primarily of a polymeric material, the improvement wherein said toothed pulley has an optimum radius for its pulley teeth addendum circle having a size between the limits of a maximum radius determined by the radius of a circle through the points of a regular polygon having N equal sides and a minimum radius determined by the radius of a circle having N arcs each equal in arcuate length to the length of each side of said polygon.

2. A pulley as set forth in claim 1 wherein said maximum radius is determined by the formula:

$$R_{max} = \frac{P - \left[2 \times PLD \times \sin\left(\frac{pi}{N}\right)\right]}{2 \sin\left(\frac{pi}{N}\right)}$$

and said minimum radius is determined by the formula:

$$R_{min} = \frac{P \times N - 2 \times pi \times PLD}{2 \, pi}$$

where P = pitch of toothed pulley and belt at pulley pitch circle,
PLD = distance between belt pitch line and belt tooth addendum circle on radius, and
N = number of pulley teeth.

3. In a toothed pulley for use in a synchronous drive power transmission system with a toothed endless power transmission belt made primarily of polymeric material, the improvement wherein said toothed pulley has an optimum radius R for its pulley teeth addendum circle determined by the simultaneous solution of the following two equations by trial and error:

$$A = 2 \sin^{-1}\left[\frac{CD}{2(R - R_p)}\right]$$

$$A = 2\left[\frac{P - CD - \frac{2pi}{N}(R + PLD)}{2(R_p - R)}\right]$$

where $CD = BW + (2R_p/\cos PA) + 2 \tan (PA)(THK - R_p)$
and where P = pitch of toothed pulley and belt at pulley pitch circle,
PLD = distance between belt pitch line and belt toothe addendum circle on radius,
N = number of pulley teeth,
R = optimum radius for the belt teeth addendum circle,
CD = rectilinear distance extending through the two points identified in connection with the angle A,
$R_p$ = radius between each tooth flank and its associated land having its radius center located on that leg defining angle A which extends through its associated tooth,
BW = bottom width of each belt tooth,
PA = belt tooth pressure angle, and
THK = belt tooth thickness.

4. A pulley as set forth in claim 3 in which the values BW, PA, and THK are known values of said belt, $R_p$ is equal to the corresponding radius at the root of a tooth of said belt, and said simultaneous solution by trial and error determines the value of each of R and A.

5. A pulley as set forth in claim 4 and further comprising a pair of side flanges on opposite sides thereof.

6. A pulley as set forth in claim 5 and made of a metallic material.

7. In a method of making a toothed pulley for use in a synchronous drive power transmission system with a toothed endless power transmission belt made primarily of a polymeric material, the improvement comprising the step of forming said toothed pulley with an optimum radius for its belt teeth addendum circle having a size between the limits of a maximum radius determined by the radius of a circle through the points of a regular polygon having N equal sides and a minimum radius determined by the radius of a circle having N arcs each equal in arcuate length to the length of each side of said polygon.

8. A method as set forth in claim 7 wherein said forming step comprises determining said maximum radius by the formula:

$$R_{max} = \frac{P - \left[2 \times PLD \times \sin\left(\frac{pi}{N}\right)\right]}{2 \sin\left(\frac{pi}{N}\right)}$$

and determining said minimum radius by the formula:

$$R_{min} = \frac{P \times N - 2 \times pi \times PLD}{2 \, pi}$$

where P = pitch of toothed pulley and belt at pulley pitch circle,
PLD = distance between belt pitch line and belt tooth addendum circle on radius, and N=number of pulley teeth.

9. In a method of making a toothed pulley for use in a synchronous drive power transmission system with a toothed endless power transmission belt made primarily of polymeric material, the improvement comprising the step of forming said toothed pulley with an optimum radius R for its pulley teeth addendum circle, said forming step comprising the step of determining said optimum minimum radius by the simultaneous solution of the following two equations by trial and error:

$$A = 2 \sin^{-1} \frac{CD}{2(R - R_p)}$$

$$A = 2 \frac{P - CD - \frac{2pi}{N}(R + PLD)}{2(R_p - R)}$$

where $CD = BW + (2R_p/\cos PA) + 2 \tan (PA) (THK - R_p)$
and where P=pitch of toothed pulley and belt at pulley pitch circle,
PLD=distance between belt pitch line and belt tooth addendum circle on radius,
N=number of pulley teeth,
R=optimum radius for the belt teeth addendum circle,
CD=rectilinear distance enxtending through the two points identified in connection with the angle A,
$R_p$=radius between each tooth flank and tis associated land having its radius center located on that leg defining angle A which extends through its associated tooth,
BW=bottom width of each belt tooth,
PA=belt tooth pressure angle, and
THK=belt tooth thickness.

10. A method as set forth in claim 9 in which said determining step comprises providing said simultaneous solution by said trial and error by successive iteration employing a computer.

11. A method as set forth in claim 10 in which said determining step comprises utilizing a standard toothed belt and its values of BW, PA, and THK.

12. A method as set forth in claim 11 in which said determining step comprises utilizing a value for $R_p$ which is equal to the corresponding radius on said belt for a curved portion extending between an associated belt tooth flank and an associated inside surface portion defining the bottom of a tooth recess.

13. A method as set forth in claim 11 in which said forming step comprises the step of machining a workpiece defining said pulley with a fully topping hob to define alternating teeth and grooves therein and employing a theoretical pitch circle found by the equation:

$$2 pi \times (R + PLD)$$

where:
R=said single optimum minimum radius, and
PLD=distance between belt pitch line and belt teeth addendum circle on radius,
each of said grooves thus defined being deeper than the belt tooth thickness and thereby providing clearance at the bottom of each tooth of said toothed belt.

14. A method as set forth in claim 13 in which said machining step comprises machining a metal workpiece and comprising the further step of defining a pair of side flanges on said toothed pulley.

15. In a synchronous drive power transmission system comprising a toothed endless power transmission belt made primarily of polymeric material and at least one toothed pulley cooperating therewith, the improvement wherein said toothed pulley has an optimum radius R for its belt teeth addendum circle determined by the simultaneous solution of the following two equations by trial and error:

$$A = 2 \sin^{-1} \frac{CD}{2(R - R_p)}$$

$$A = 2 \frac{P - CD - \frac{2pi}{N}(R + PLD)}{2(R_p - R)}$$

where $CD = BW + (2R_p/\cos PA) + 2 \tan (PA) (THK - R_p)$
and where P=pitch of toothed pulley and belt at pulley pitch circle,
PLD=distance between belt pitch line and belt teeth addendum circle on radius,
N=number of pulley teeth,
R=optimum radius for the belt teeth addendum circle,
CD=rectilinear distance extending through the two points identified in connection with the angle A,
$R_p$=radius between each tooth flank and its associated land having its radius center located on that leg defining angle A which extends through its associated tooth.
BW=bottom width of each belt tooth,
PA=belt tooth pressure angle, and
THK=belt tooth thickness.

16. A drive system as set forth in claim 15 in which the values BW, PA, and THK are known values of said belt, $R_p$ is equal to the corresponding radius at the root of a tooth of said belt, and said simultaneous solution by trial and error determines the value of each of R and A.

17. A drive system as set forth in claim 16 and further comprising a pair of side flanges on opposite sides of said pulley.

18. A drive system as set forth in claim 17 in which said pulley is made of a metallic material.

19. A drive system as set forth in claim 17 in which said toothed belt has fabric material comprising its toothed inside surface.

20. A drive system as set forth in claim 19 in which said toothed belt has a helically wound load-carrying cord defining its neutral axis.

* * * * *